June 6, 1944.  A. T. NABSTEDT  2,350,411

CLUTCH MECHANISM

Filed March 21, 1941  3 Sheets-Sheet 2

Inventor
Arthur T. Nabstedt
By Rockwell Bartholow
Attorneys

June 6, 1944.　　　A. T. NABSTEDT　　　2,350,411
CLUTCH MECHANISM
Filed March 21, 1941　　　3 Sheets-Sheet 3

Inventor
Arthur T. Nabstedt
By Rockwell & Bartholow
Attorneys

Patented June 6, 1944

2,350,411

UNITED STATES PATENT OFFICE 2,350,411

CLUTCH MECHANISM

Arthur T. Nabstedt, Hamden, Conn., assignor to The Snow-Nabstedt Gear Corporation, a corporation of Connecticut Application March 21, 1941, Serial No. 384,460

8 Claims. (Cl. 192—53)

This invention relates to clutch mechanism which can be used very advantageously in connection with marine reverse gears, although not limited to that application.

One of the objects of the invention is to provide a clutch which is very rugged and capable of transmitting a relatively large amount of power.

Another object is to provide a clutch mechanism of such construction that it takes hold in a gradual manner so as to operate very smoothly.

Another object is to provide a clutch of such characteristics that it is well adapted to marine use either as a one-way clutch or in connection with a reverse gear.

To these and other ends the invention consists in the novel features and combinations of parts to be hereinafter described and claimed.

Figure 1:
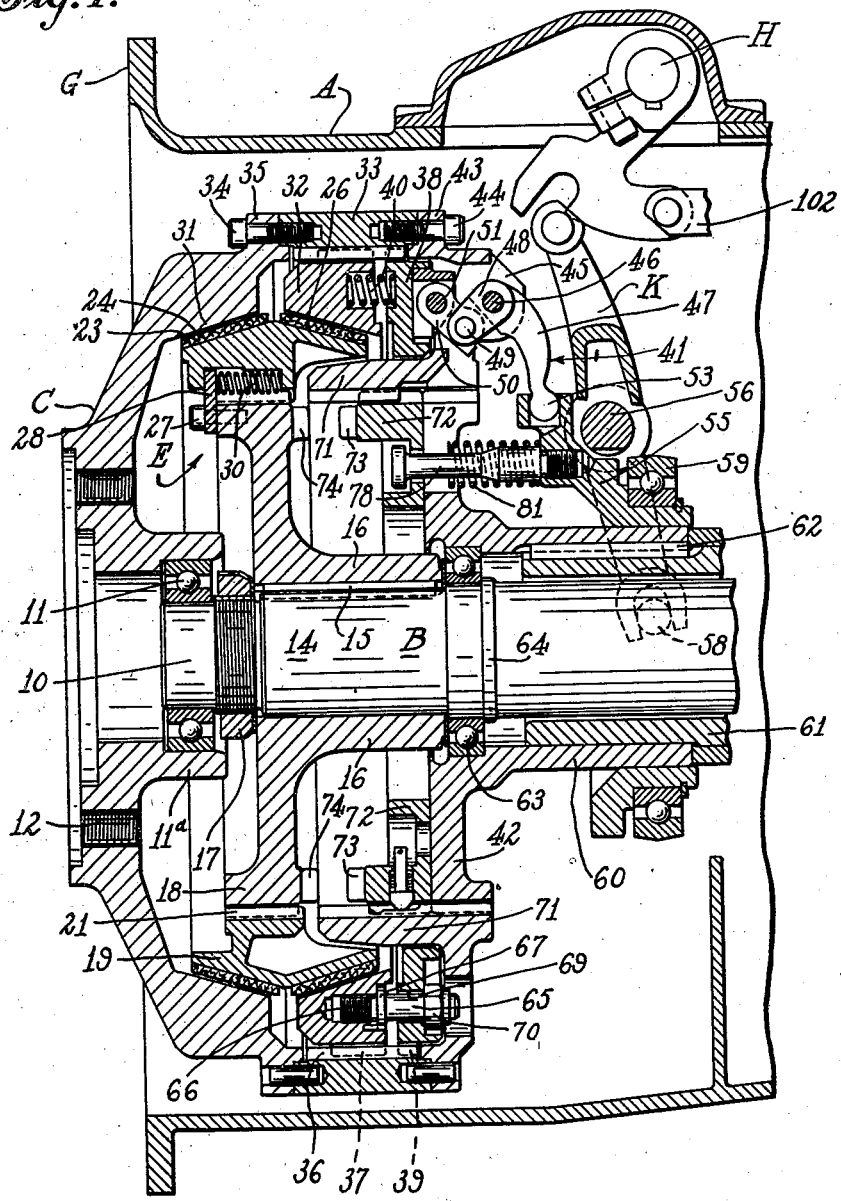
Figure 2:
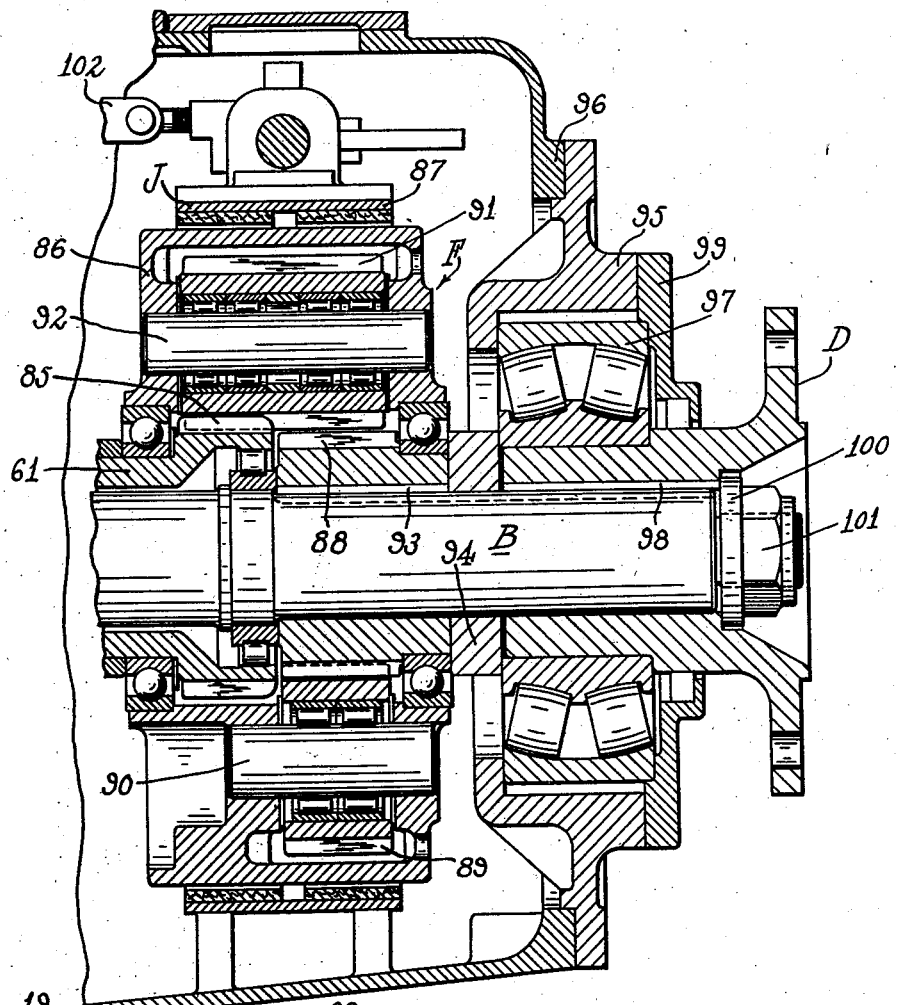
Figure 4:
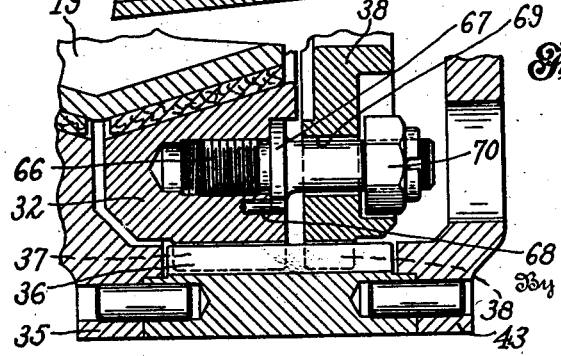
Figure 3:
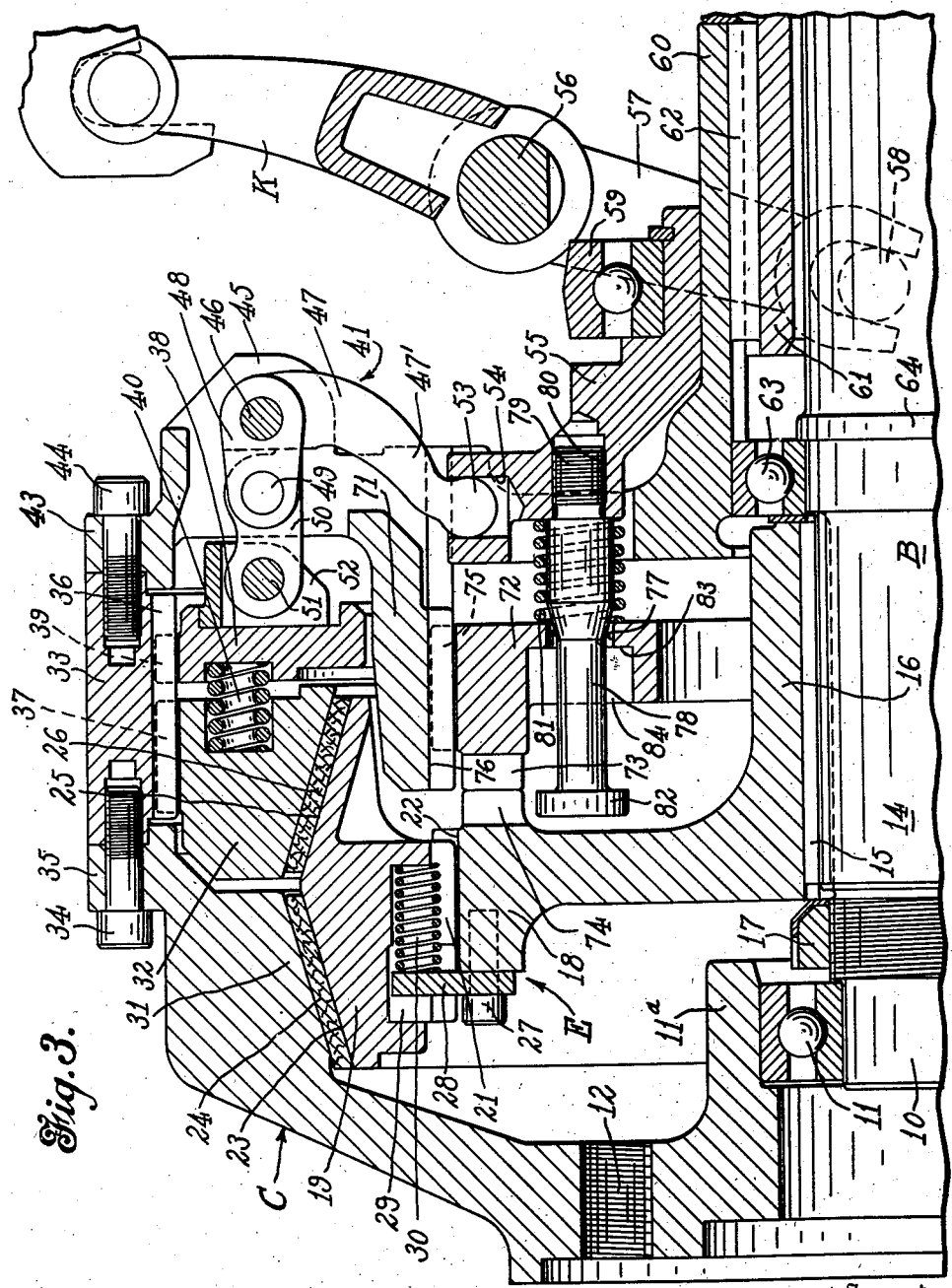

In the accompanying drawings:

Figs. 1 and 2 in conjunction show in vertical longitudinal section a reverse gear embodying my improvements, the same being in neutral position;

Fig. 3 is an enlarged sectional view of those parts illustrated in the upper portion of Fig. 1, showing the position for forward drive, with the positive driving dogs or lugs in engagement with each other but not yet interlocked; and Fig. 4 is a detail of the tie connection between certain parts of the friction clutch mechanism, showing the parts in position for forward drive.

In the drawings I have shown for illustrative purposes a reverse gear such as employed in marine use for driving from an engine of considerable horsepower a propeller shaft or other driven shaft. In this mechanism as illustrated there is a housing adapted to be placed on a suitable bed between the engine and the propeller shaft, and in this housing is a longitudinal shaft intended to be placed directly in line with the engine shaft and the propeller shaft or other power take-off, this shaft having suitable bearings in the housing. As illustrated, the forward end of the main shaft or central shaft of the gear has in association therewith a member in the nature of a flange or plate adapted to be fastened to the rear end of the engine shaft; and the rear end of the main shaft is provided with a coupling adapted to be suitably connected to the forward end of a propeller shaft or other power take-off. Within the housing and disposed about the central shaft is a clutch mechanism at the forward end, the clutch mechanism in this particular case including a friction clutch mechanism and a positive clutch mechanism adapted to operate in the event that there is slippage of the friction clutch. Within the rear portion of the housing, disposed concentrically with respect to the shaft, is a set of gears which provides for the reverse drive.

In the drawings the housing is shown at A, the central shaft at B, the flange or plate adjacent the front end of said shaft at C, and the coupling member or hub at the rear end of said shaft at D. The clutch mechanism in the forward end of the housing is indicated generally at E, and the gearing in the rear portion of the housing at F. The housing A is provided at its forward end with a flange G by means of which it can be bolted or otherwise fastened to the rear end of the engine housing. Mounted transversely in the housing at the upper part thereof and about midway of the ends is an operating shaft H adapted to be actuated by an exteriorly disposed mechanism which it is not necessary to illustrate. From this operating shaft H, which is a rock shaft, is adapted to be actuated a brake mechanism J associated with the gearing F, and an actuating lever K for the clutch mechanism E.

Referring now to the details of this mechanism, it will be noted that the forward extremity of shaft B is reduced, as shown at 10, and has disposed about it an anti-friction bearing 11 providing for the free rotation of the flange or plate C, which flange or plate in this particular case has an inwardly projecting hub portion 11ª by which it is rotatably mounted with respect to the extremity of shaft B. The flange C is provided in this case with holes 12 by means of which it can be bolted to a suitable flange (not shown) on the engine shaft. The flange C is of considerable diameter and is of a dished shape to provide at its inner side a cavity for certain clutch parts, hereinafter described, and at the periphery of flange C the same is provided with a rim or axially extending wall structure cooperating with the clutch and other parts in the manner hereinafter described.

To the right of portion 10 (Fig. 1) shaft B has a full-diametered portion 14 to which is keyed by a key 15 a hub member or hub body 16. This member is prevented from dislocation on the shaft by a nut 17 screwed on the shaft. The hub member 16 has a web portion with an outer widened flange or rim 18, on which is movably mounted and keyed an axially movable friction clutch member 19, presented oppositely inclined conical friction surfaces. The member 19 is preferably formed as a ring having a body mounted to slide axially along the periphery of hub member 19, and provided with a plurality of splines or teeth 21 engaging grooves 22. At its forward part member 19 is provided with a cone surface 23 to which is applied friction facing material 24. At the rear part of member 19 the latter has a cone surface 25 to which is applied friction facing material 26. The sliding movement of member 19 on flange 18 is limited and controlled in a suitable manner, and in this particular case the rim of the hub member has applied to it by bolts 27 the ring or flange 28 located in a recessed intermediate portion 29 of member 19 and engaged at a number of points by helical springs 30. These springs 30 urge member 19 toward the free or disengaged position shown in Fig. 1.

Cooperating with the axially movable friction clutch member 19 are two parts having inner friction surfaces of such inclination as to be engageable with the inclined friction facings 24 and 26. One of these parts is a fixed rim part 31 of the flange member C, which part may be in one piece with member C, as in the case illustrated. This part 31 is adapted to be engaged by the friction material 24. The other part previously mentioned, namely, that engaged by friction facing 26, is constituted by a separate axially movable member 32 in the form of a ring. This member 32 is housed within the peripheral or rim portion of the engine-driven member. In this particular case an axially extending wall 33 is bolted by means of bolts 34 to a short flange 35 provided at the periphery of member C so as to provide a part of the rim or periphery of the engine-driven member. This wall 33 is of ring shape, and it is provided on its inner surface at suitable intervals with longitudinal grooves 36 engaged by splines or projections 37 on ring 32 in such a manner that ring 32 can move longitudinally of the structure to a limited extent, but at all times partakes of the rotation of member C.

Behind ring-like clutch member 32 is a plate member 38 having a forward face opposing the rear face of member 32. Plate 38 is provided at suitable intervals with splines or teeth 39 engaging the grooves 36 so that the plate is rotated by the engine-driven member although capable of independent axial movement. Coil springs 40 are arranged at intervals between plate 38 and member 32, the tendency of these springs being to separate these parts to a certain extent. Plate 38 can be shifted by sets of levers located at spaced intervals in the circumference of the plate, for example, three sets of levers, one such set being indicated generally at 41. Each such set of levers has a mounting on the peripheral or rim portion of the engine-driven member, and in this particular case the mounting of the levers is provided on a member 42 having a portion 43 attached to the rear part of wall 33 by means such as bolts 44. This member 42 is provided at intervals with rearwardly projecting pairs of cheeks 45, each pair of cheeks providing a mounting for a set of levers 41. Between the cheeks of each pair is pivoted by means of a pivot pin 46 a lever 47 in the form of an elbow, having a portion 47' below the pivot, and another portion 48 extending forwardly from the pivot. The forward end of portion 48 is pivoted by a pin 49 to a short lever 50, which in turn is pivoted by pin 51 extending between cheeks 52 projecting rearwardly from the plate 38. The lever portions 48 and 50 together form part of a toggle, which, when the parts are moved toward the position of Fig. 3, shifts plate 38 forwardly, whereas when the levers are moved in the opposite direction, plate 38 is carried rearwardly to the position shown in Fig. 1. These movements are brought about by manipulation of the portions or arms 47' of the elbow levers, which portions 47' have rounded extremities 53 engaged in recesses 54 in the peripheral portion of a collar 55 movable axially from actuating lever K. The lever K has an intermediate pivot at 56, and below this pivot is provided with a fork 57 the extremities of which engage pins 58 carried by a ball bearing 59 mounted in a peripheral groove on collar 55. Thus as lever K is swung on its pivot or fulcrum, collar 55 is moved axially to bring about operation of the lever devices 41, and thereby the axially movable plate 38, which plate 38, through the action of the springs 40, is adapted to shift the clutch element 32.

The member 42, previously referred to, having a web connected to the peripheral part of the engine-driven member, is also provided with a rearwardly extended central sleeve portion 60, as best shown in Fig. 1, this sleeve portion preferably being integral with the web portion. It is upon this sleeve portion that the collar 55, previously mentioned, is mounted for sliding movement. In the position of Fig. 1 the collar is at the rear part of the sleeve portion, and in the position of Fig. 3 the collar is adjacent the forward end of the sleeve portion. The sleeve portion 60 surrounds and overlaps a sleeve 61 forming a part of a gear comprised in the gear set F, hereinafter described. This overlapping relation of the two sleeves is shown in Fig. 1, and also in Fig. 3, and it will be noted that the inner sleeve 61 freely surrounds shaft B, but that the outer sleeve 60 is keyed to sleeve 61 by one or more keys 62. Thus by drive of member 42, which is driven from the engine-driven member C, the gear-carrying or operating sleeve 61 is driven.

Behind the sleeve or hub portion of the hub member 16 an anti-friction bearing 63 surrounds the shaft B, this anti-friction bearing being in front of a shoulder 64 formed on the shaft. The central portion of member 42 engages this anti-friction bearing.

For tying together the friction clutch members 32 and 38 at suitable intervals and limiting their separating movements, tie bolts 65 can be employed, one of which bolts is shown in Fig. 4. The bolt has a shank with a threaded portion 66 engaging a threaded socket open at the rear face of member 32. At the front of the socket the bolt shank carries an integral collar 67 which may be pinned in place by a pin 68 to prevent its displacement. In front of the collar 67 the bolt shank has a smooth portion engaging a hole 69 in the plate 38. At the rear face of the plate 38 the bolt has applied to it a nut 70. It will, therefore, be understood that plate 38 is guided on the bolt body between the nut and the collar 67.

The web-like member 42 is provided with a forwardly projecting flange 71, preferably integral therewith, which serves as a guide for a positive clutching or dogging member 72. The member 72 is formed as a ring embracing with clearance the sleeve portion of hub member 16, and in this particular form is provided at the front face with a circumferential series of locking dogs or lugs 73 adapted to fit between and interlock with correspondingly formed dogs or lugs 74 projecting rearwardly from the web of hub member 16. The member 72 is provided on its periphery with a plurality of teeth or ribs 75 engaging and movable in correspondingly shaped grooves 76 in the inner face of member 71. The grooves 76 are somewhat longer than the teeth 75, and assist in providing a means for interlocking the members 71 and 72 while permitting axial movement of member 72 for engagement and disengagement of the positive clutch between the member 72 and the hub member. It will be noted that the outer surface of member 71 is located in proximity to the inner surface of plate 38, and that member 71 extends forwardly under a part of member 19 which carries the inclined friction surfaces. Positive clutching ring 72 is provided with a series of holes 77 through which project in a forward direction plungers or pin-like elements 78. These pin-like elements at their rear ends are externally threaded, as indicated at 79, to engage threaded sockets 80 in the sliding collar 55. Immediately in front of the sockets 80 the shanks of pins 78 are enlarged and the enlarged portions are surrounded by helical springs 81, which are confined between the rear face of ring 72 and the front face of the collar, and have a tendency, when the collar is in the position shown in Fig. 3, to bring about engagement and interlock of the dogs or lugs 73, 74. At the front ends of the pins 78 the same are provided with heads 82 which, in the position of Fig. 3, are inactive, but which, as the collar 55 is moved back to the position of Fig. 1, are adapted to engage the bottoms 83 of sockets 84 in the front face of ring 72 so as to pull ring 72 to a rearward inoperative position.

As previously indicated, sleeve 61 forms part of or carries a gear constituting a portion of the gear set F, and in the particular case illustrated, sleeve 61 has integral therewith at its rear end a gear 85. This gear 85 is located within a rotary cage or carrier 86 adapted to be held in fixed position by the encircling band 87 of brake mechanism J. The gear set is of usual construction, comprising, for purposes of obtaining reverse motion of a gear 88, a plurality of short pinions 89 having short shafts 90, and a plurality of intergeared long pinions 91 having shafts 92. The gear 88 is concentric with gear 85 and is keyed to shaft B by means such as one or more keys 93. The gear 88 is in front of the coupling member D, and separated therefrom by a member 94 forming a part of a bearing structure 95 attached to the open rear portion 96 of the housing. This bearing structure 95 carries interiorly an anti-friction bearing 97 in which the forward portion of coupling member D is rotatively mounted. Coupling member D is keyed to shaft B by means such as a key 98. The bearing structure 95 may have a removable cover plate 99 at the rear thereof provided with an opening by which it embraces a portion of coupling member D. Coupling member D may be held in the assembled position by collar 100 engaging a rear socket in the coupling member and held in place by means such as a nut 101 on the reduced rear extremity of the shaft.

In Figs. 1 and 2 I have shown the reverse gear in the neutral position. Here it will be noted that the friction clutch mechanism comprising the element 19 is disengaged, and that the positive clutch comprising the ring 72 and the dogs 73 and 74 is disengaged. Rotation imparted to engine-driven member C is not imparted to hub member 16, but the rotation of the engine-driven member causes continuous rotation of member 42, sleeve 61, gear 85, and the gear 85 in rotating carries along with it to an extent the pinion cage or carrier, which is free to rotate about the shaft.

For bringing about forward drive, actuating shaft H is shifted to move lever K to the position shown in Fig. 3. This causes the forward shifting of collar 55, which brings about the movement of each lever device 41 to the position shown in Fig. 3. In this movement, in which the toggles are straightened, the plate 38 is thrust forwardly, pushing on springs 40. These springs 40, pushing on friction clutch ring 32, shift that element forwardly so as to bring its inner inclined face into contact with the adjacent friction face of member 19, causing the rotation of member 19, its connected hub member 16, and shaft B to be initiated. As member 19 starts to rotate by reason of its connection with member 32, it is also forced in a forward direction by forwardly moving member 32, and this results in member 19 engaging by its forward conical portion the inner conical surface of the rim portion 31 of the engine-driven flange, whereby this portion of the flange becomes active in driving hub member 16. By operating in the manner described, the friction clutch takes hold in a gentle and gradual manner, bringing the shaft up to speed without shock. It will be understood that under these conditions the engine-driven member, by means of oppositely inclined friction surfaces associated with its rim portion, will drive the shaft through the hub situated on and locked to the forward end of the shaft. The member 42 and the gear 85 driven therefrom will continue their rotation, as previously described. The gear 88 being keyed to the shaft will be positively rotated, and the gear cage and its pinions will rotate with the shaft at the same speed.

It will be noted that as the collar 55 is thrust to the position of Fig. 3, the springs 81 will push against the rear face of positive locking ring 72 and thrust said ring to a position such as shown in Fig. 3, wherein the dogs or lugs 73 are in contact with the rear faces of the dogs or lugs 74. The springs 81 may, in fact, thrust ring 72 to such a position that the lugs 73 are in the spaces between the lugs 74 so as to bring about a positive drive of hub member 16 by engagement of said hub member with ring 72, which is locked to the engine-driven member to be rotated thereby. In such circumstances hub member 16 would have positive drive from ring 72, as well as friction drive from the friction clutch ring 32 and the friction-surface-equipped portion 31 of the flange. In the event that the ring 72 is not interlocked with the hub member 16, as above described, and in the event that there be such extreme load as to bring about slippage of the friction clutch, angular shifting of dogs 73 and 74 relatively to each other will quickly ensue, and as soon as dogs 73 are opposite the spaces between the dogs 74, they will be pushed into these spaces by the springs 81, and when this quickly occurs there will be positive rotation of member 16 and its connected shaft from engine-driven ring 72.

For bringing the reverse gear from the direct drive position back to the neutral position, lever K is shifted from the position of Fig. 3 to the position of Fig. 1. This causes rearward sliding movement of the collar 55, carrying with it the inner ends of the levers 41, and breaking the toggles so that ring 38 is carried back to the position of Fig. 1. This permits friction ring 32 to be shifted rearwardly as the forward thrust on the cone ring 19 is relieved, and this ring moves rearwardly under the action of its springs 30, pressing against the flange-like part on the ring. The ring 32 is moved out of engagement with member 19, and the member 19 by its springs is carried out of engagement with the portion 31 of the flange. The pins or plungers 78 withdraw the locking ring 72 to an inoperative position, as previously described.

For moving the reverse gear parts to the position for reverse drive, the actuating shaft H is actuated in such a manner as to thrust rearwardly a link 102 connected to the brake mechanism J in a well-known manner. The rearward thrust of link 102 causes tightening of brake band 87 on the pinion cage or carrier, which is thereby arrested in its rotation. The rotation of gear 85 continues as before, as will be understood, and the axes of the pinions 89 and 91 being held stationary, the rotation of gear 85 causes gear 88 and shaft B connected thereto to be rotated in the opposite direction.

By my invention the construction of the reverse gear as a whole is considerably simplified and improved, bringing about greater compactness, strength and sturdiness, and at the same time improving the operation. A relatively short shaft can be used, with the clutch elements, gear set and actuating levers compactly grouped about the shaft in such a manner as to conserve space without interfering with accessibility for repairs and replacements if after long service these are needed. The strong and yet gradual action of the friction clutch elements is of great importance. The friction clutch structure is very sturdy, but in the event of slippage of the friction clutch, direct drive of the shaft and its connected propeller shaft or the like is practically instantaneously brought about as the positive locking means comes into play.

There is ample clearance for the friction clutch parts when the reverse gear is in neutral, and these parts are few in number, and the frictional engagement is obtained between cone surfaces. There is entire elimination of dragging, heating, and power loss such as occur in connection with the use of multiple plate clutches. If used on speed boats having two or more propeller shafts, each driven by an individual engine, the free neutral position reducing drag and heating when the speed boat is cruising with one or more engines cut out, is a factor of great importance. It is very important to cut down or eliminate drag in the friction clutch, for if this clutch drags it creates heat, power loss, and a drag in the propeller which reduces the speed of the boat, and this defect is cumulative. On the other hand, the improved reverse gear has the additional advantage that transmission of power through the gears only takes place in the reverse motion. The friction clutch is spring loaded so that no adjustment is required, and by using an opposed cone clutch an axial pressure is produced which is double that applied by the operating lever. The reverse gear as a whole has the so-called flywheel effect, in that the principal masses turn at all times at the same speed and direction as the flywheel.

While I have shown herein only one form of my improved clutch mechanism, it will be understood that the invention can be embodied in many other forms, and that various changes and modifications in the organization of parts and in the details can be made without departing from the principles of the invention or the scope of the claims.

What I claim is:

1. In clutch mechanism, the combination of a power-driven member mounted for rotation adjacent one end of a shaft, said power-driven member being generally of flange form, a hub fixed to said shaft adjacent said power-driven member and having oppositely inclined cone friction surfaces movably associated with its periphery, clutch elements associated with the peripheral portion of said flange adapted to engage said cone surfaces for driving the hub, a web connected to the peripheral portion of said flange, said web carrying a forwardly directed flange-like member located radially inwardly of said clutch elements, and a positive clutching member for driving said hub positively having slidable keyed engagement with said forwardly directed flange-like member.

2. A clutch mechanism such as set forth in claim 1, in which said web carries levers by means of which one of the friction clutch elements is shifted.

3. In clutch mechanism, the combination of a power-driven member mounted for rotation adjacent one end of a shaft, said power-driven member being generally of flange form, a hub fixed to said shaft adjacent said power-driven member and having oppositely inclined cone friction surfaces associated with its periphery, said flange carrying clutch elements adapted to engage said cone surfaces for driving the hub from said power-driven member, a web connected to the peripheral portion of said flange, a friction clutch actuating plate, actuating levers for said plate carried by said web, a sliding collar for actuating the levers, and a positive locking ring movable from the collar and keyed to a portion of said web for axial movement and adapted in one position to drive said hub positively.

4. A clutch mechanism such as set forth in claim 3, in which the positive locking ring is keyed to a forwardly directed flange-like member carried by the web and in which a sliding cone clutch ring constituting one of the clutch elements is located radially outwardly of said flange-like member.

5. In clutch mechanism, a flange having a peripheral rim, a hub having an outstanding web, means for clutching said flange to said hub comprising a ring keyed to the hub web having a friction surface facing a friction surface on said flange and movable axially relatively thereto, a plate device interlocked with the rim of said flange and movable axially, and a clutch member interposed between said plate device and said ring and spring pressed from said plate device and having a cone surface to engage a cone surface on said ring, said last-named clutch member being moved axially by the plate device and serving to move said ring into frictional engagement with the flange, and means for shifting said plate device.

6. In clutch mechanism, a flange having a rim, a hub, a ring keyed to the peripheral portion of said hub and slidable axially with respect thereto and having a cone friction surface facing a cone friction surface on said flange and adapted to engage the same, a plate interlocked with the rim of said flange and movable axially relatively thereto, an axially movable clutch member interposed between said plate and said ring and having a cone friction surface to engage a cone surface on said ring, said clutch member being keyed to said flange rim, a plurality of springs interposed between said clutch member and said plate, a plurality of elbow levers pivotally carried by said flange rim, means for shifting said levers, and a plurality of levers pivoted to said plate and to said elbow levers and constituting with portions of said elbow levers toggles for shifting said plate and thereby said clutch member in order to force said clutch member into frictional contact with said ring and said ring into contact with the friction surface on the flange.

7. In clutch mechanism, a member generally of flange form mounted for rotation and having a generally axially disposed rim, a hub having a sleeve portion embracing a shaft and a web extending outwardly from said sleeve portion, a double cone friction member keyed to and movable axially on the periphery of the hub web and having a conical surface overhanging the hub web at one side engageable with an internal conical surface formed within a recess of said flange and having its other conical surface overhanging the web at the opposite side, a plate in the form of an annulus keyed at its outer part to the rim of said flange and axially movable, means for shifting said plate, an axially movable cone ring keyed to the rim of the flange and having its body located between said plate and said double cone member and adapted to engage said other conical surface of said double cone member, and resilient pressure transmitting means between said cone ring and said plate.

8. In clutch mechanism, a flange having a rim, a hub in respect to which said flange is in generally enclosing relation, one of said members being a driving member and the other a driven member, a plate interlocked with the rim of said flange within said rim and axially movable, an axially movable clutch member at that side of said plate disposed toward the body of said flange and keyed to said rim, a plurality of springs interposed between said clutch member and said plate, a plurality of elbow levers pivotally carried by said flange rim, means for shifting said levers, a plurality of levers pivoted to said plate and to said elbow levers and constituting with portions of said elbow levers toggles for shifting said plate and thereby said clutch member, and a second clutch member co-acting with the first mounted on the peripheral part of said hub.

ARTHUR T. NABSTEDT.